United States Patent
Campagna et al.

(10) Patent No.: US 9,621,545 B2
(45) Date of Patent: *Apr. 11, 2017

(54) SYSTEM AND METHOD FOR CONNECTING CLIENT DEVICES TO A NETWORK

(71) Applicant: Certicom Corp., Mississauga (CA)

(72) Inventors: Matthew John Campagna, Ridgefield, CT (US); Daniel Richard L. Brown, Mississauga (CA); Gregory Marc Zaverucha, Redmond, WA (US)

(73) Assignee: Certicom Corp., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,392

(22) Filed: Jul. 14, 2015

(65) Prior Publication Data

US 2015/0319164 A1    Nov. 5, 2015

Related U.S. Application Data

(63) Continuation of application No. 13/741,598, filed on Jan. 15, 2013, now Pat. No. 9,106,635.

(60) Provisional application No. 61/605,598, filed on Mar. 1, 2012.

(51) Int. Cl.
    *H04L 29/06* (2006.01)
    *H04L 29/08* (2006.01)
    *H04L 9/08* (2006.01)
    *H04L 9/30* (2006.01)

(52) U.S. Cl.
    CPC ........ *H04L 63/0823* (2013.01); *H04L 9/0847* (2013.01); *H04L 9/0869* (2013.01); *H04L 63/08* (2013.01); *H04L 63/126* (2013.01); *H04L 63/166* (2013.01); *H04L 67/14* (2013.01); *H04L 9/3066* (2013.01); *H04L 63/18* (2013.01)

(58) Field of Classification Search
    CPC .... H04L 63/0823; H04L 63/166; H04L 67/14
    USPC ....................................... 726/4, 10
    See application file for complete search history.

(56) References Cited

U.S. PATENT DOCUMENTS

| | | | |
|---|---|---|---|
| 7,448,068 B2 | 11/2008 | Sun et al. | |
| 7,467,405 B2 | 12/2008 | Cheng | |
| 2002/0067832 A1* | 6/2002 | Jablon | ............... 380/277 |
| 2003/0191946 A1 | 10/2003 | Auer et al. | |
| 2003/0200431 A1 | 10/2003 | Stirbu | |
| 2006/0095767 A1* | 5/2006 | Krishnamurthi et al. | .... 713/168 |
| 2006/0098814 A1 | 5/2006 | Al-Khoraidly et al. | |
| 2007/0136800 A1 | 6/2007 | Chan et al. | |
| 2007/0211893 A1* | 9/2007 | Frosik et al. | ............... 380/30 |
| 2007/0248224 A1* | 10/2007 | Buskey et al. | ............... 380/30 |

(Continued)

OTHER PUBLICATIONS

Kufer, L; Search Report from corresponding European Application No. 13151270.9; search completed May 13, 2013.

(Continued)

*Primary Examiner* — Harunur Rashid
(74) *Attorney, Agent, or Firm* — Fish & Richardson P.C.

(57) ABSTRACT

A system and method are provided for enabling a client device to connect to a network. The method comprises: obtaining an authorization code via a communication channel different from the network, the authorization code corresponding to the client device; and after detecting initiation of a security negotiation protocol by the client device, using the authorization code in at least one security negotiation operation.

18 Claims, 13 Drawing Sheets

(56) References Cited

U.S. PATENT DOCUMENTS

| | | | |
|---|---|---|---|
| 2008/0069338 A1* | 3/2008 | Relyea | H04L 9/3066 380/28 |
| 2009/0214025 A1* | 8/2009 | Golic | 380/28 |
| 2010/0037311 A1 | 2/2010 | He et al. | |
| 2011/0252230 A1 | 10/2011 | Segre | |
| 2012/0023336 A1* | 1/2012 | Natarajan | H04L 9/0841 713/179 |
| 2012/0042160 A1 | 2/2012 | Nakhjiri et al. | |
| 2013/0024699 A1* | 1/2013 | Muir et al. | 713/176 |
| 2013/0046993 A1* | 2/2013 | Jueneman et al. | 713/186 |
| 2014/0013453 A1* | 1/2014 | Futa et al. | 726/32 |

OTHER PUBLICATIONS

Wong, C.; Search report from corresponding PCT Application No. PCT/CA2013/050150; search completed Jun. 12, 2013.

Communication pursuant to Article 94(3) EPC in application 13151270.9 dated Nov. 17, 2015; 5 pages.

Office Action issued in Chinese Application No. 201380012082.5 on Nov. 14, 2016.

* cited by examiner

SYSTEM AND METHOD FOR CONNECTING CLIENT DEVICES TO A NETWORK

CROSS-REFERENCE TO RELATED APPLICATIONS

The present application is a continuation of U.S. application Ser. No. 13/741,598 filed on Jan. 15, 2013, which claims priority from U.S. Provisional Application No. 61/605,598 filed on Mar. 1, 2012 incorporated herein by reference

TECHNICAL FIELD

The following relates to systems and methods for connecting client devices to a network.

DESCRIPTION OF THE RELATED ART

In networked environments, client devices that wish to join a network first find a network and then join that found network. Acceptance to a network is typically performed by a router, server, or other network controller or access device, hereinafter referred to as a "trust center". In some networked environments, the client devices joining and communicating over the network operate using little or no user interfaces. Despite the limited interfaces of such client devices, the client device should be able to not only join a network, but join the correct network. Similarly, the trust center should be able to allow only acceptable client devices to join its network.

Networks such as home area networks (HAN) may utilize a security negotiation protocol such as the transport layer security (TLS) protocol or its predecessor, the Secure Sockets Layer (SSL) protocol, as the underlying security protocol for the network. The TLS protocol is a well known communication protocol that provides communications privacy and data integrity, and allows client/server applications to communicate in a way that is designed to prevent or inhibit eavesdropping, tampering, and message forgery.

In environments where the TLS or SSL protocols are used, including environments where client devices are provisioned with a digital certificate ("certificate" hereinafter), it can be difficult to indicate to the joining client device which network and trust center it should join. It can also be difficult to extract information from the joining client device and access the trust center to limit which client devices should be joining. Such difficulties are often referred to as the "steering problem".

To address steering problems, the typical model is to provide the trust center with a small amount of identifying information about a client device that will be joining the network. Typically, the identifying information should be in a form that allows for easy human input by either a terminal or keypad. Once this information is known at the trust center, the trust center goes into an "allow joining" mode. At this time, the certified joining client device can prove that it is the device associated with the identifying information and is allowed to join the network.

A security concern with this model is that a rogue trust center could accept joining in a promiscuous mode, thus tricking a joining client device into joining the wrong network. Another security concern is that a rogue client device could attempt to join the network via the trust center during the allow joining phase and before the intended device is able to join.

BRIEF DESCRIPTION OF THE DRAWINGS

Embodiments will now be described by way of example only with reference to the appended drawings wherein.

DETAILED DESCRIPTION

Figure 1:
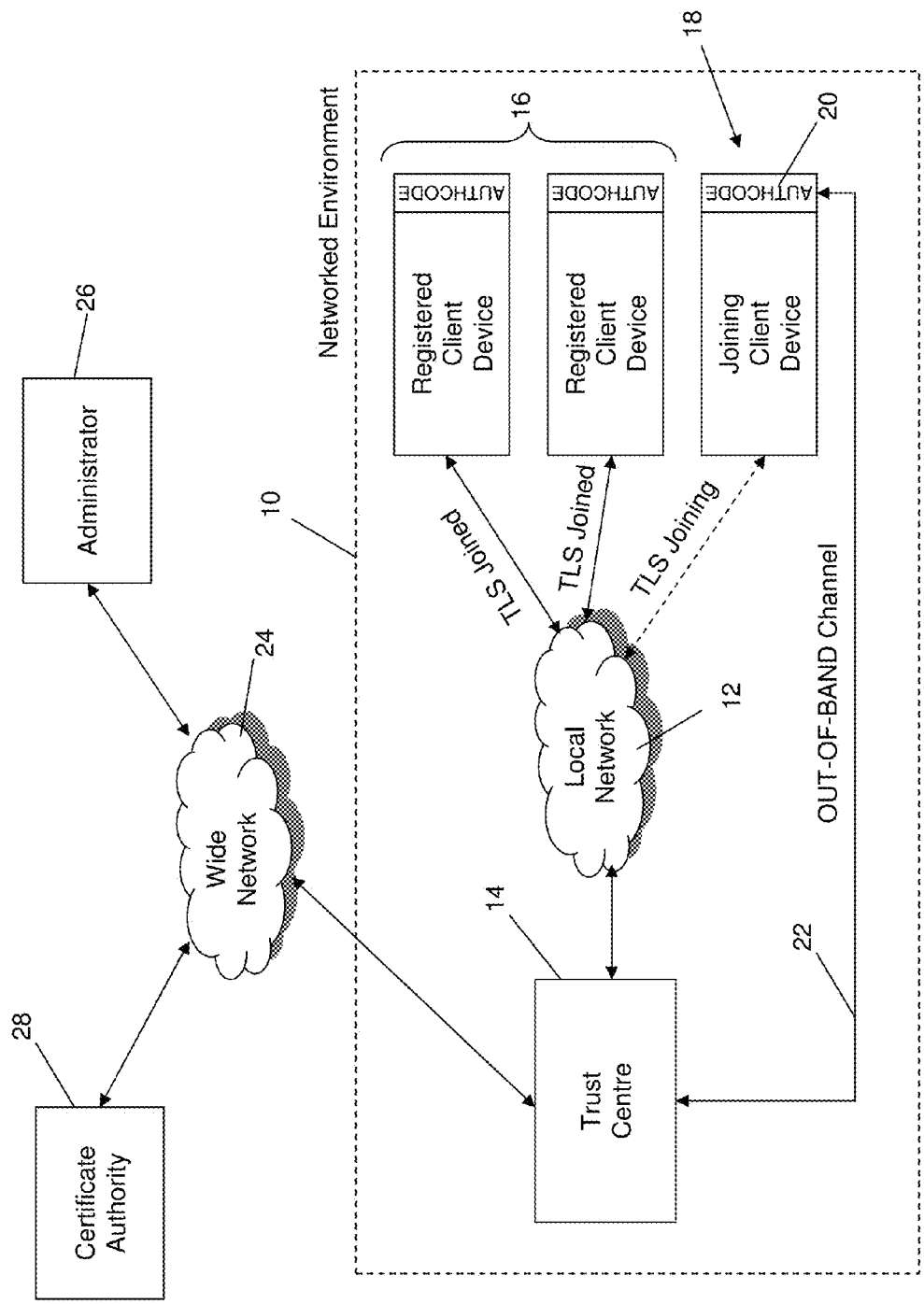
FIG. 1 is a schematic diagram of a communication system including a networked environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In order to address the steering problem in networked environments that provide communication security, authorization codes (AUTHCODEs) for particular client devices are established in both the trust center and the joining client devices, and the AUTHCODEs are incorporated in at least one operation used in a security negotiation between the respective joining client device and the trust center. The AUTHCODE enables the trust center to identify the correct joining device and the joining devices to identify the correct trust center and thus obtain assurance that they have joined the correct network.

It can be appreciated that the principles discussed below may be utilized in various security negotiation protocols in which the AUTHCODE can be provided to the trust center out-of-band and such AUTHCODE can be used in at least one cryptographic operation utilized by the underlying security negotiation protocol. Examples include, without limitation, various TLS protocol versions including predecessor SSL versions and Datagram TLS (DTLS), IPSec, etc. Various examples provided herein illustrate these principles in a networked environment utilizing a version of the TLS or SSL protocols, hereinafter referred to as the "TLS protocol" for illustrative purposes.

In one example scenario, a client device may establish a TLS session with a trust center wherein both the client device and the trust center have a certified signing key (e.g., an Elliptic Curve Digital Signature Algorithm (ECDSA) signing key) from a certificate authority (CA) recognized by each other. Prior to accepting a session, the trust center is given an out-of-band AUTHCODE. The TLS protocol to be used during a joining phase is modified to utilize the AUTHCODE. In this scenario it is assumed that the legitimate trust center and each legitimate client device, as well as any rogue client device has, or is otherwise capable of having, a valid certificate containing a public key suitable for ECDSA signing, and is in possession of a corresponding private key. It is also assumed that all joining client devices have an associated AUTHCODE. The AUTHCODE may be provided on or with the client device in various ways, including, being printed on the exterior of the device (e.g., on the back of a housing), in associated packaging material, etc. The AUTHCODE is a randomly generated value that is meant to be provided to the trust center out-of-band and thus not transmitted over network being joined.

Referring now to FIG. 1 a networked environment 10 including a local network 12 is shown. Access to the local network 12 for at least some devices, is managed by a trust center 14. It can be appreciated that the trust center 14 may represent any router, server, or other network controller or access device responsible for permitting or denying access to the local network 12 for client devices. In the example shown in FIG. 1, two types of client devices are shown, registered client devices 16 and joining client devices 18. Registered client devices 16 include client devices that have successfully joined the local network 12 by registering with the trust center 14. Joining client devices 18 include client devices that are attempting to join the local network 12 by registering with the trust center 14. It can be appreciated that joining client devices 18 may include both legitimate and rogue client devices.

The registered client devices 16 and joining client devices 18 each include an AUTHCODE 20 that can be ascertained from the device itself, e.g., from an exterior portion thereof. In order to have the AUTHCODE 20 used in at least one TLS operation, an out-of-band channel 22 is established between the joining client device 18 and the trust center 14.

The out-of-band channel 22 is shown as being within the networked environment 10, however, the out-of-band channel 22 may also be established outside of the network environment 10. The out-of-band channel 22 may include, for example, a user interface provided by the trust center 14 which enables manual entry of the AUTHCODE 20 into the trust center 14 or a database or memory controlled by or otherwise accessible to the trust center 14. The out-of-band channel 22 may also be established using a telephone or web-based connection with an administrator 26 associated with the trust center 14 thus enabling the AUTHCODE 20 to be provided by a user of the joining client device 18 when attempting to add the joining client device 18 to the local network 12. In this way, the administrator 26 may push the AUTHCODE 20 down to the trust center 14 via an external network such as the wide network 24 shown in FIG. 1. The administrator 26 or trust center 14 or both the administrator 26 and trust center 14 may also communicate with a certificate authority (CA) 28 over the wide network 24 for obtaining certificates used, for example, in the TLS protocol. Where certificates are used, the registered and joining client devices 16, 18 also include certified signing keys and thus may also be communicable with the CA 28 over the wide network 24. It can be appreciated that in other examples, the client devices 16, 18 may not utilize certificates obtained from a CA 28. For example, the client devices 16, 18 may utilize self-signed certificates or unsigned public keys, and the AUTHCODE 20 may be used to authenticate such client devices 16, 18 to the trust center 14.

Figure 2:
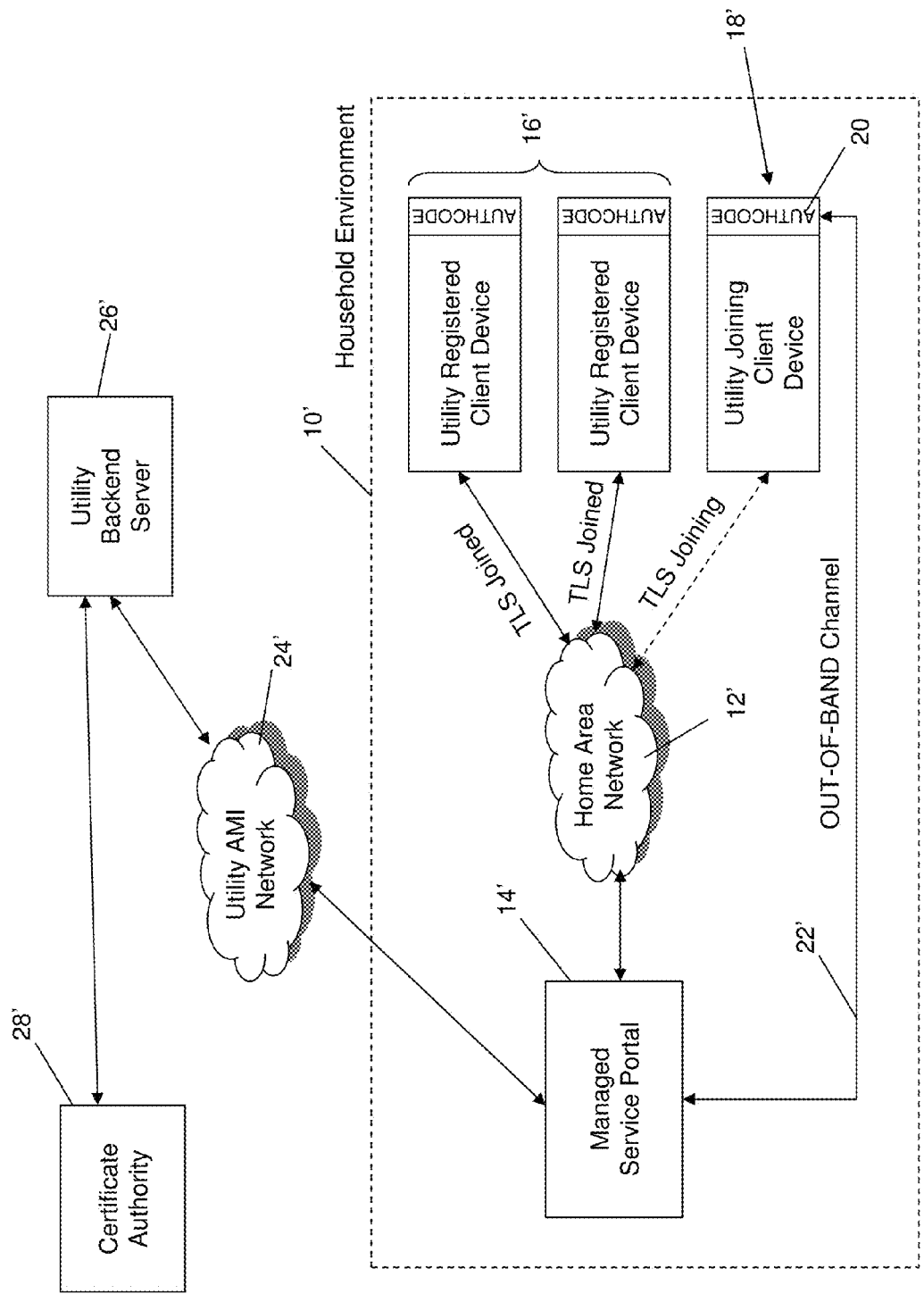
FIG. 2 is a schematic diagram of a communication system including a home network.

An example of a networked environment 10 is shown in FIG. 2. FIG. 2 illustrates a household environment 10' that includes a home area network (HAN) 12', e.g., for a smart home system or advanced metering infrastructure (AMI). The HAN 12' in this example is controlled by a managed service portal 14', which permits utility registered client devices 16' to communicate with the HAN 12' and permits or denies access to utility joining client devices 18'. The client devices 16', 18' may include, for example, electronic thermostats, large home appliances, HVAC systems, etc. The client devices 16', 18' include AUTHCODEs 20 and provide the AUTHCODEs 20 to the managed service portal14' via an out-of-band channel 22', similar to that described above. The managed service portal14' communicates with a utility backend server 26' via a utility AMI network 24'. The utility backend server 26' is responsible for communicating with the managed service portal14' and passes information regarding utility joining devices 18' and initiates the joining period for adding such joining devices 18'. The utility backend server 26' may also communicate with a CA 28' in order to obtain certified signing keys for the managed service portals 14' that are used by the utility. The managed service portals 14' may also be installed with certificates already stored therein via a procurement practice. The utility backend server 26' may then look up signing/identity information of the utility joining device 18' joining the managed service portal 14' to ensure the certificate has not been revoked.

Figure 3:
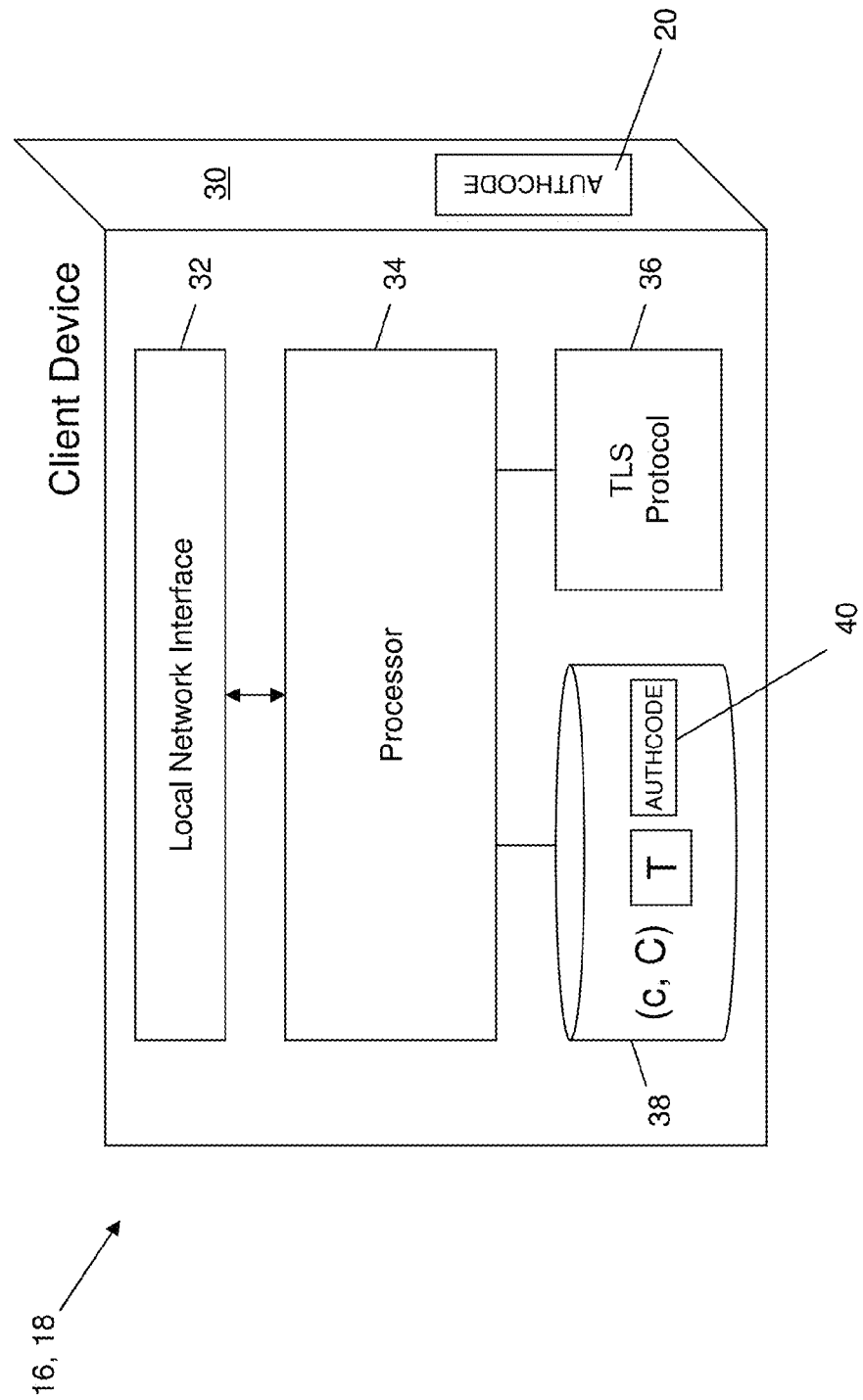
FIG. 3 is a block diagram illustrating an example of a configuration for a client device in the networked environment.

An example of a configuration for a client device 16, 18 is shown in FIG. 3. The client device 16, 18 includes a body, housing or other physical portion providing an exterior surface 30 on which the AUTHCODE 20 may be printed or otherwise made visible to a user. The client device 16, 18 also includes a local network interface 32 to enable a processor 34 to communicate with the local network 12, e.g., using a TLS protocol 36. The TLS protocol 36 shown in FIG. 3 represents any computer executable instructions that operate the processor 34 to enable the client device 16, 18 to participate in TLS operations, such as a TLS handshake, a TLS application phase, etc. The client device 16, 18 also includes a memory 38 for storing data. In this example, the memory 38 stores a private/public key pair (c, C) of the client device 16, 18, and a public key T of the trust center 14. The memory 38 also stores an electronic version or representation of the AUTHCODE 40 to enable the AUTHCODE 20 printed on the exterior surface 30 of the client device 16, 18 to be used in TLS operations.

Figure 4:
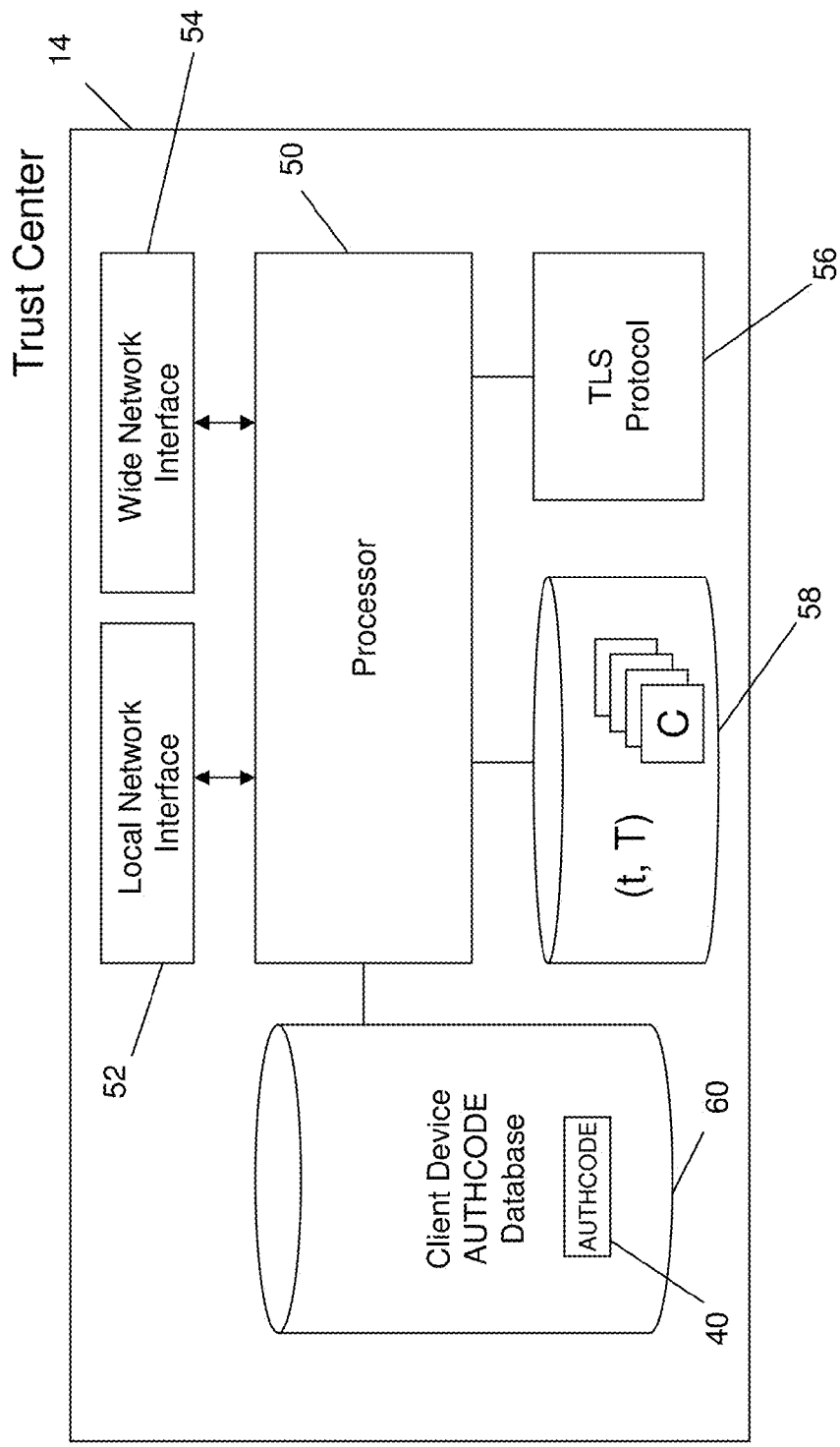
FIG. 4 is a block diagram illustrating an example of a configuration for a trust center in the networked environment.

FIG. 4 illustrates an example of a configuration for the trust center 14. The trust center 14 in this example includes a processor 50, a local network interface 52 for communicating via the local network 12, and a wide network interface 54 for communicating via the wide network 24. It can be appreciated that the local network interface 52 and wide network interface 54 are shown as separate components for illustrative purposes only and that a single network interface module may be used. The processor 50 has access to the TLS protocol 56 and has access to a memory 58. The memory 58 stores a private/public key pair (t, T) of the trust center 14. The memory 58 also stores public keys C of the client devices 16, 18, which are typically provided to the trust center 14 during execution of the security negotiation protocol, e.g., using a certificate. The trust center 14 also includes or otherwise has access to a client device AUTHCODE database 60 for storing electronic versions or representations of AUTHCODES 40 of the registered client devices 16 and those joining client devices 18 that have utilized the out-of-band channel 22.

Figure 5:
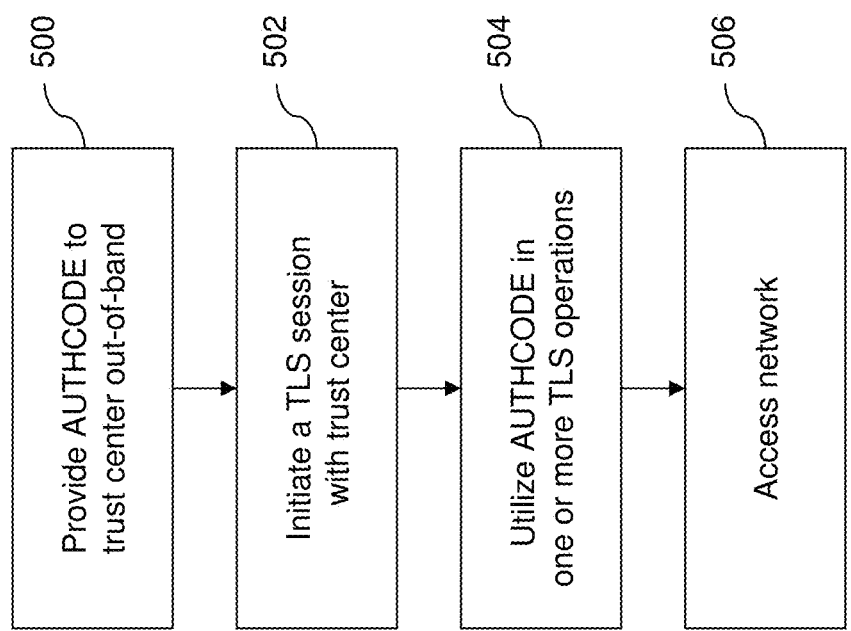
FIG. 5 is a block diagram illustrating an internet protocol (IP) stack used in the networked environment.

Referring now to FIG. 5, the TLS protocol may be modified using the AUTHCODE 40 by providing the AUTHCODE 20 from the client device 16, 18 to the trust center 14 at 500 using the out-of-band channel 22. For example, when a user wishes to add a new joining client device 18 to the local network 12, a user interface provided by the trust center 14 may be accessed and the representation of the AUTHCODE 40 entered into the user interface. The joining client device 18 may then initiate a TLS session with the trust center 14 at 502. The AUTHCODE 40 stored by the joining client device 18 is then used in one or more TLS operations at 504, examples of which are provided below. Assuming the trust center 14 has successfully obtained and utilized the same AUTHCODE 40 stored in the AUTHCODE database 60, the joining client device 18 is permitted to access the local network 12 at 506 using the established secure channel, and thereafter the trust center 14 treats the joining client device 18 as a joined client device 16 thus providing access to, for example, network resources, etc. Similarly, the joined client device 16 now has assurance that the joined client device 16 has joined the correct trust center 14.

Figure 6:
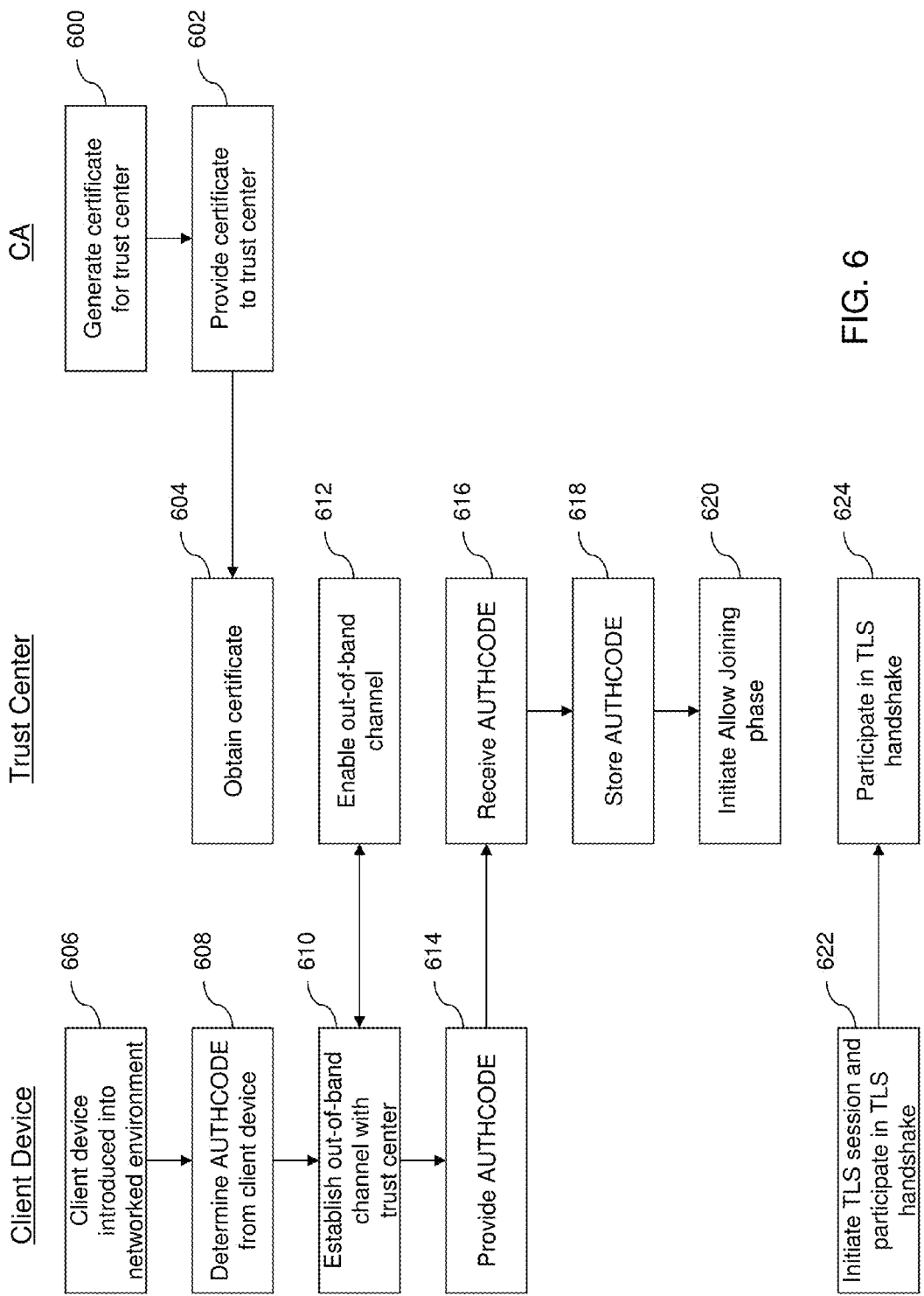
FIG. 6 is a flow chart illustrating an example of a set of computer executable operations that may be performed in providing an authentication code (AUTHCODE) to a trust center via an out-of-band channel.

FIG. 6 illustrates an example of a set of operations that may be performed in enabling a trust center 14 and joining client device 18 to participate in a TLS handshake. At 600, the CA 28 generates a certificate for the trust center 14 and provides the certificate to the trust center 14 at 602, and the trust center obtains the certificate at 604. It can be appreciated that operations 600-604 are optional depending on whether certificates are used and the certificate being issued to the trust center 14 may be provided using any suitable certificate fulfillment process, which may include a certificate revocation check or verification of the certificate. The joining client device 18 is introduced into the networked environment 10 at 606 and the AUTHCODE 20 provided on the exterior surface 30 of the joining client device 18 is determined at 608. The out-of-band channel 22 is established at 610, which is enabled by the trust center 14 at 612.

For example, the trust center 14 may provide a browser-based user interface to enable the AUTHCODE 20 to be entered. The AUTHCODE 20 is provided at 614 and received by the trust center 14 at 616. The representation of the AUTHCODE 40 is stored in the AUTHCODE database 60 by the trust center 14 at 618. The trust center 14 then initiates the allow joining phase for the joining client device 18 associated with the stored AUTHCODE 40 at 620. Once the allow joining phase has been initiated, the joining client device 18 may initiate a TLS session at 622 and participate in a TLS handshake to register the joining client device 18. The trust center 14 also participates in the TLS handshake at 624.

Figure 7:
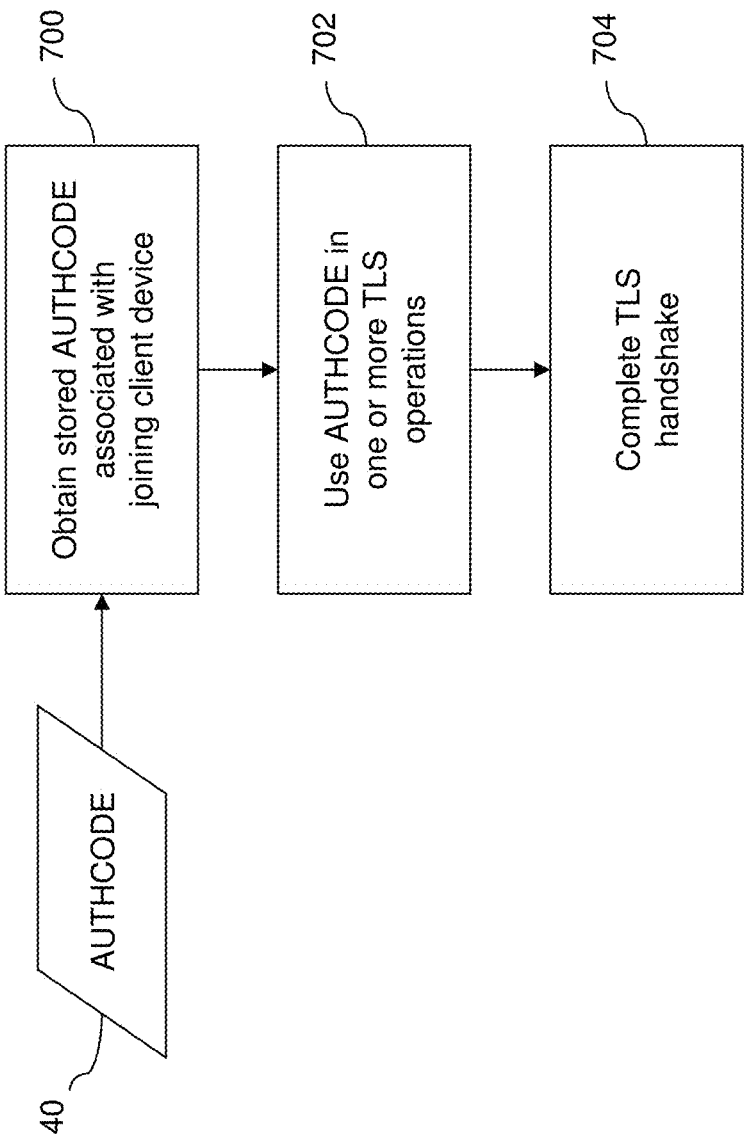
FIG. 7 is a flow chart illustrating an example of a set of computer executable operations that may be performed in using the AUTHCODE in performing a TLS handshake.

FIG. 7 illustrates a set of computer executable operations that may be performed by a joining client device 18 or the trust center 14 in using the AUTHCODE 40 provided to the trust center 14 via the out-of-band channel 22. At 700 a stored AUTHCODE 40 associated with the joining client device 18 that has initiated the TLS session, is obtained from memory 38, 60. The AUTHCODE 40 is used in one or more TLS operations at 702 and the TLS handshake is completed at 704.

It can be appreciated that there exist various TLS-based mechanisms for performing the TLS handshake. As such, when applied to applications using TLS or SSL, there are various ways in which the AUTHCODE 40 may be used in addressing the aforementioned steering problem. The following provides several examples in which the AUTHCODE 40 is used in one or more TLS operations to encourage the correct joining client device 18 to communicate and register with the correct trust center 14 and thus join the correct local network 12. In the following examples, it may be assumed that the TLS protocol being used includes a key exchange algorithm such as those described in the Elliptic Curve Cryptography (ECC) Cipher Suites for TLS RFC 4492 document. The following examples may utilize the Ephemeral Elliptic Curve Diffie Hellman with ECDSA (ECDHE_ECDSA) key exchange algorithm. However, it can be appreciated that the principles discussed herein also apply to other key exchange algorithms such as ECDH_ECDSA, ECDH_RSA, ECDHE_RSA, etc. wherein the client devices 16, 18 and trust center 14 can derive a final session key from the AUTHCODE 40.

Figure 8:
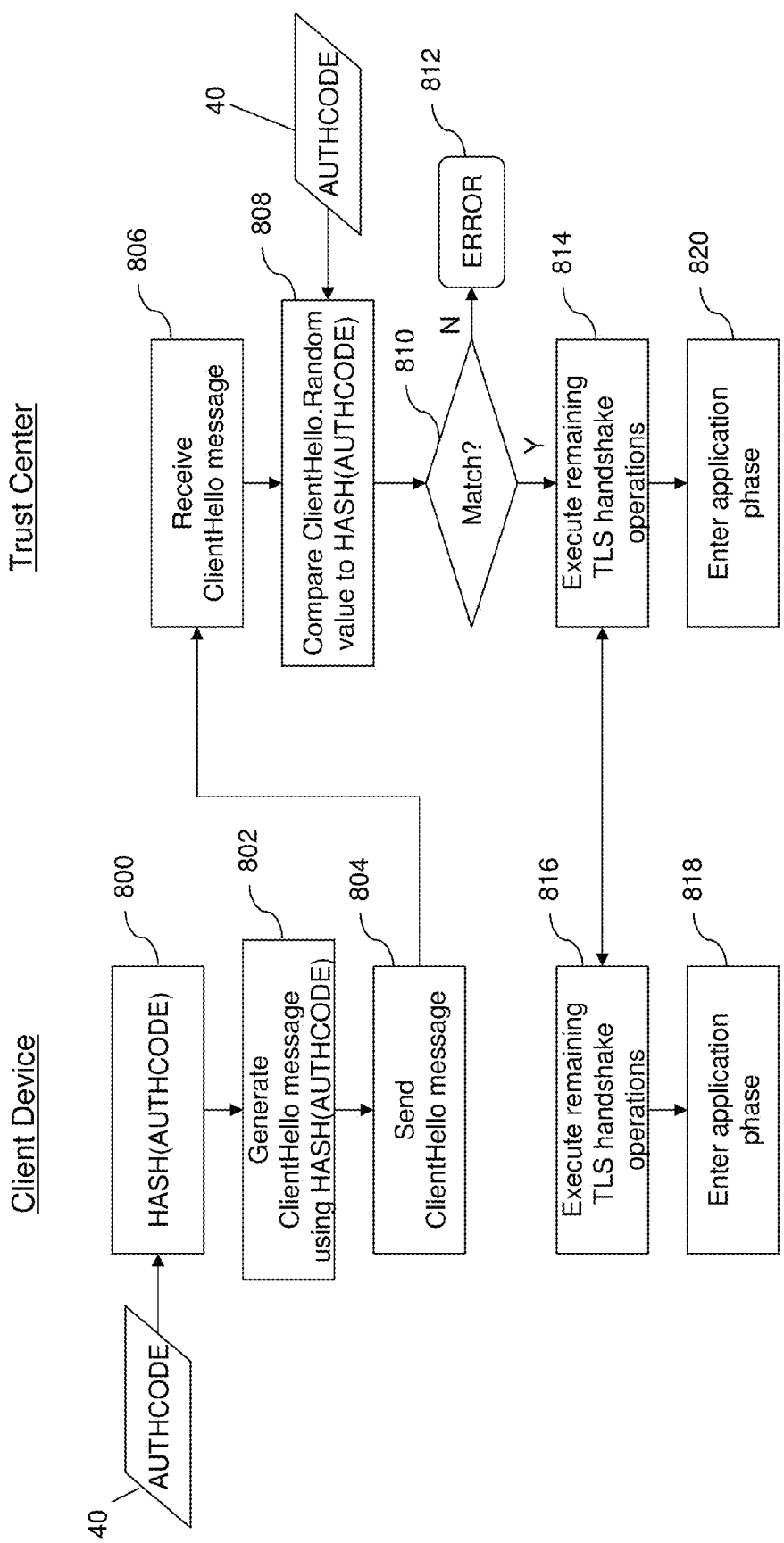
FIG. 8 is a flow chart illustrating an example of a set of computer executable operations that may be performed in using the AUTHCODE in performing a TLS handshake.

Referring now to FIG. 8, an example is shown wherein the random value included in a ClientHello message used during a TLS handshake is substituted by the joining client device 18 with the AUTHCODE 40. As is well known in the art, the ClientHello message in a TLS handshake is sent during the negotiation phase and is sent by the client to specify the highest TLS protocol version the client supports, and to provide a random number, a list of suggested cipher suites, and compression methods. For the example shown in FIG. 8, it may be assumed that when performing ECDHE_ECDSA in TLS, the ClientHello.random value does not contribute to the overall security of the TLS session. It has been recognized that the ClientHello.random value can be repurposed as evidence of knowledge of the AUTHCODE 40, and further that the AUTHCODE 40 can be substituted for the ClientHello.random value in the generation of the master_secret and key_block operations during the TLS handshake.

Assuming that both the joining client device 18 and the trust center 14 have the AUTHCODE 40, i.e. AUTHCODE 20 has been transmitted or otherwise provided to the trust center 14 via the out-of-band channel 22, after the joining client device 18 initiates the TLS session, the joining client device 18 transforms the AUTHCODE 40 at 800 using a HASH function, e.g., the cryptographic hash utilized by the TLS session. The joining client device 18 then generates a ClientHello message at 802 using the hash of the AUTH-CODE 40 as the ClientHello.random value and sends the ClientHello message to the trust center 14 at 804. The trust center 14 receives the ClientHello message at 806 and compares the ClientHello.random value in the message to a hash of the AUTHCODE 40 generated by the trust center 14 at 808.

The trust center 14 determines if there is a match at 810. If the compared values differ, the TLS session is halted with an error at 812 and the process is terminated. If the compared values match, the trust center 14 executes the remaining portions of the TLS handshake at 814 using the AUTH-CODE 40 internally during computation of the master_secret and key_block. The joining client device 18 also executes the remaining TLS handshake operations at 816 using the AUTHCODE 40 instead of the ClientHello.random value internally during the computation of the master_secret and key_block. Accordingly, the TLS handshake will complete successfully and enter the application phase at 818 and 820 only if the trust center 14 knows the AUTHCODE 40 and uses the AUTHCODE 40 in performing the master_secret and key_block computations as noted above.

Figure 9:
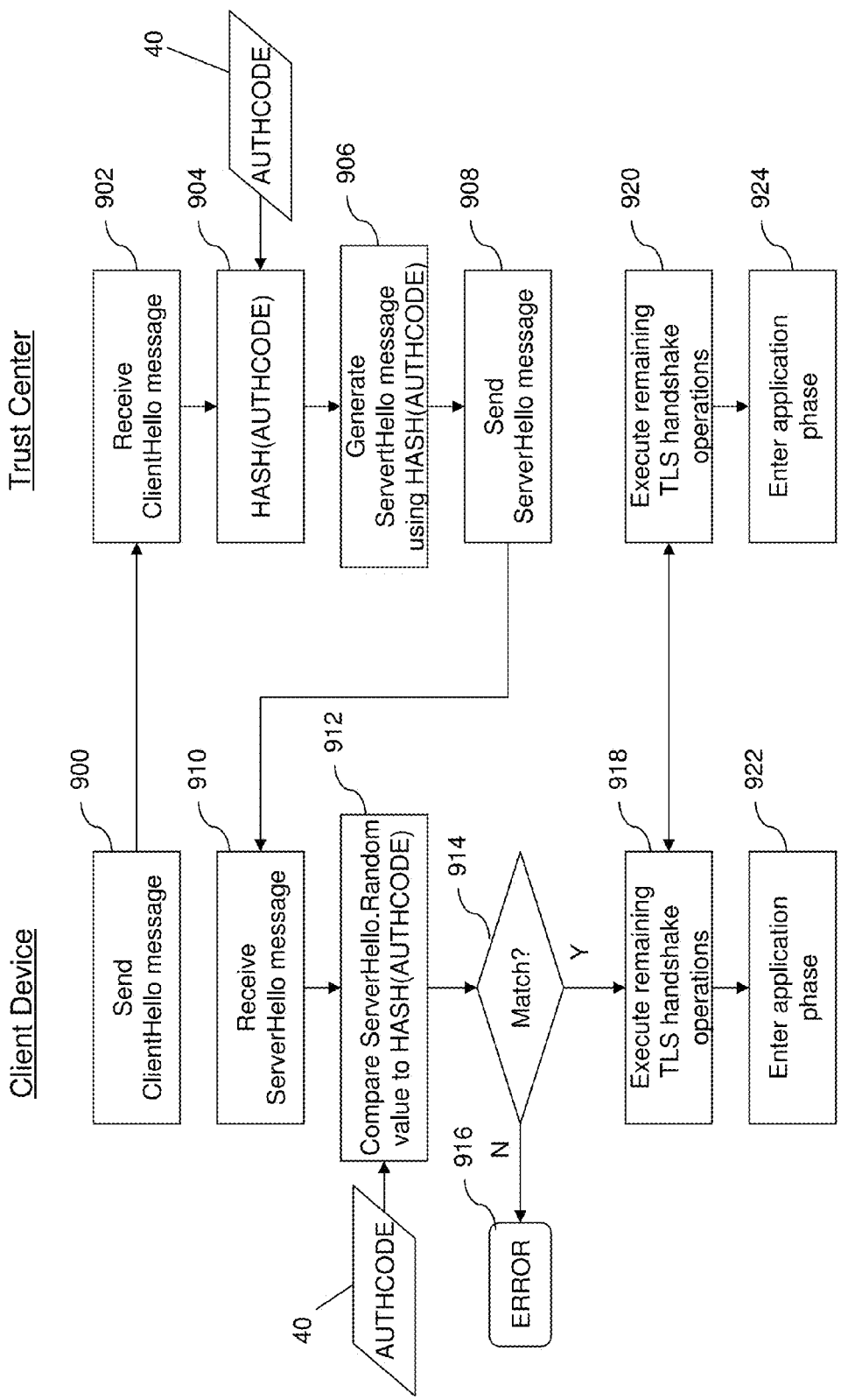
FIG. 9 is a flow chart illustrating an example of a set of computer executable operations that may be performed in using the AUTHCODE in performing a TLS handshake.

Referring now to FIG. 9, an example is shown wherein the random value included in a ServerHello message used during a TLS handshake is substituted by the trust center 14 with the AUTHCODE 40. As is well known in the art, the ServerHello message in a TLS handshake is sent as a response to the ClientHello message during the negotiation phase and is sent by the server to specify the chosen TLS protocol version, and to provide a random number, a cipher suite, and compression method from the choices offered by the client. For the example shown in FIG. 9, it may be assumed that when performing ECDHE_ECDSA in TLS, the ServerHello.random value does not contribute to the overall security of the TLS session. It has been recognized that the ServerHello.random value can be repurposed as evidence of knowledge of the AUTHCODE 40, and further that the AUTHCODE 40 can be substituted for the ServerHello.random value in the generation of the master_secret and key_block operations during the TLS handshake.

Assuming that both the joining client device 18 and the trust center 14 have the AUTHCODE 40, i.e. AUTHCODE 20 has been transmitted or otherwise provided to the trust center 14 via the out-of-band channel 22, after the joining client device 18 initiates the TLS session, the joining client device 18 sends a ClientHello message to the trust center 14 at 900, which is received by the trust center 14 at 902. The trust center 14 transforms the AUTHCODE 40 at 904 using a HASH function, e.g., the cryptographic hash utilized by the TLS session. The trust center 14 then generates a ServerHello message at 906 using the hash of the AUTHCODE 40 as the ServerHello.random value and sends the ServerHello message to the joining client device 18 at 908. The joining client device 18 receives the ServerHello message at 910 and compares the ServerHello.random value in the message to a hash of the AUTHCODE 40 generated by the joining client device 18 at 912.

The joining client device 18 determines if there is a match at 914. If the compared values differ, the TLS session is halted with an error at 916 and the process is terminated. If the compared values match, the joining client device 18 executes the remaining portions of the TLS handshake at 918 using the AUTHCODE 40 internally during computation of the master_secret and key_block. The trust center 14 also executes the remaining TLS handshake operations at 920 using the AUTHCODE 40 as the ServerHello.random value internally during the computation of the master_secret and key_block. Accordingly, the TLS handshake will complete successfully and enter the application phase at 922 and 924 only if the joining client device 18 knows the AUTHCODE 40 and substitutes the AUTHCODE 40 into the master_secret and key_block computations as noted above.

Figure 10:
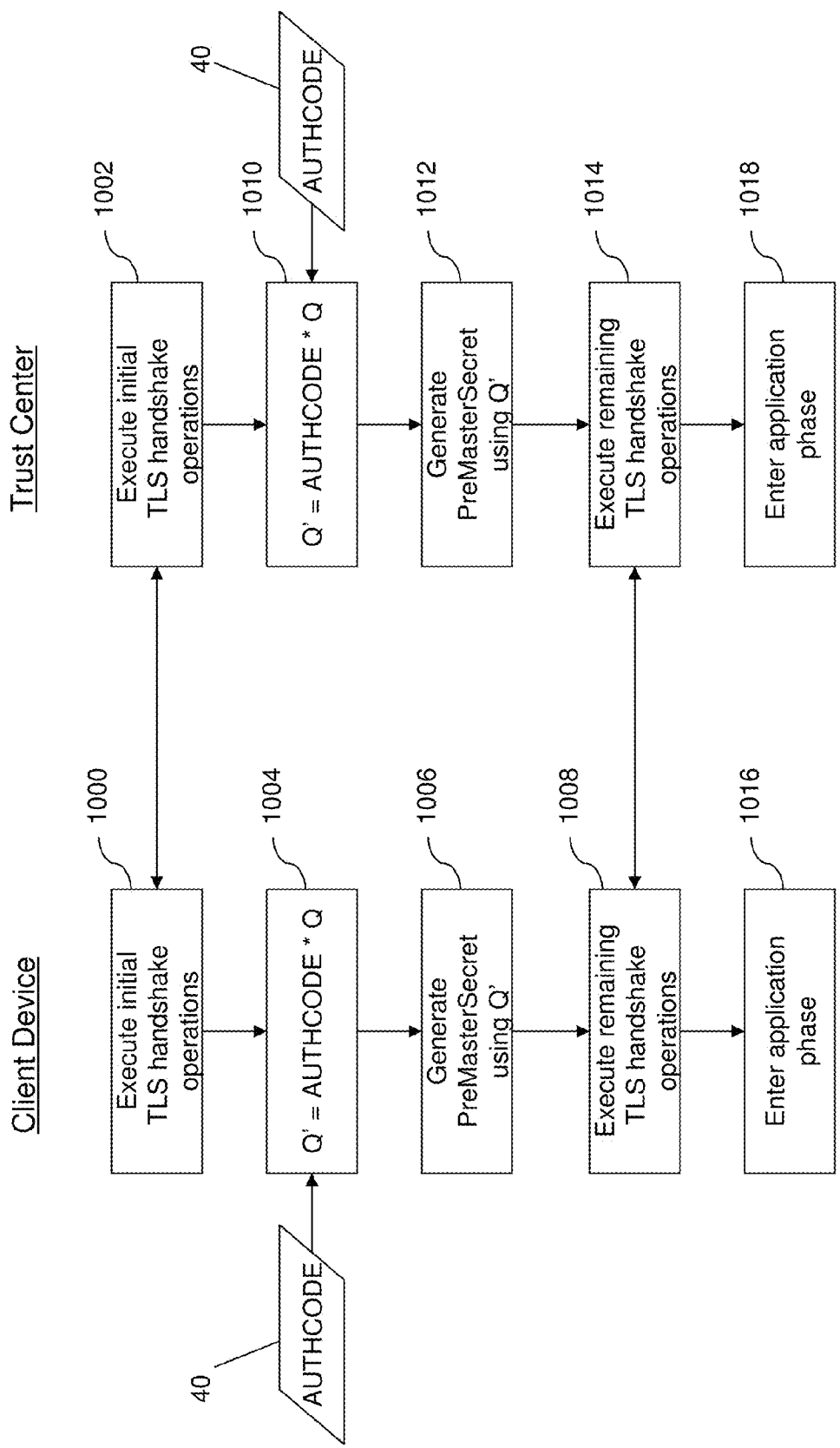
FIG. 10 is a flow chart illustrating an example of a set of computer executable operations that may be performed in using the AUTHCODE in performing a TLS handshake.

Referring now to FIG. 10, it is also recognized that the AUTHCODE 40 can be used to create a second base point for an ECDHE computation without affecting the overall security of the TLS session. The second base point may therefore be used to form the pre_master_secret in the TLS handshake. In the example shown in FIG. 10, a negotiated ECDHE value Q may be modified by an additional scalar multiplication, namely: AUTHCODE*Q, wherein AUTHCODE is interpreted as an integer modulo the order of the base point of the elliptic curve group in which the TLS session is operating.

The joining client device 18 and trust center 14 execute one or more initial TLS handshake operations at 1000 and 1002 respectively, according to the TLS algorithm being used. For example, the joining client device 18 and trust center 14 may exchange ClientHello and ServerHello messages, certificate and certificate request messages, etc. At 1004 the joining client device 18 modifies the secret elliptic curve point Q by computing Q'=AUTHCODE*Q. As noted above, the AUTHCODE 40 is interpreted as an integer modulo the order of the elliptic curve group in which the TLS session is operating. The joining client device 18 then forms the pre_master_secret at 1006 using the x-coordinate of Q' and executes any remaining TLS handshake operations at 1008 wherein the TLS handshake will complete successfully only if the trust center 14 also knows the AUTHCODE 40 and modifies the shared secret elliptic curve point Q in a similar fashion.

As such, at 1010 the trust center 14 modifies the secret elliptic curve point Q by computing Q'=AUTHCODE*Q. As noted above, the AUTHCODE 40 is interpreted as an integer modulo the order of the elliptic curve group in which the TLS session is operating. The trust center 14 then forms the pre_master_secret at 1012 using the x-coordinate of Q' and executes any remaining TLS handshake operations at 1014 wherein the TLS handshake will complete successfully only if the joining client device 18 also knows the AUTHCODE 40 and modifies the shared secret elliptic curve point Q in a similar fashion.

Assuming the TLS handshake is successful, the joining client device 18 and trust center 14 enter the TLS application phase at 1016 and 1018 respectively.

Figure 11:
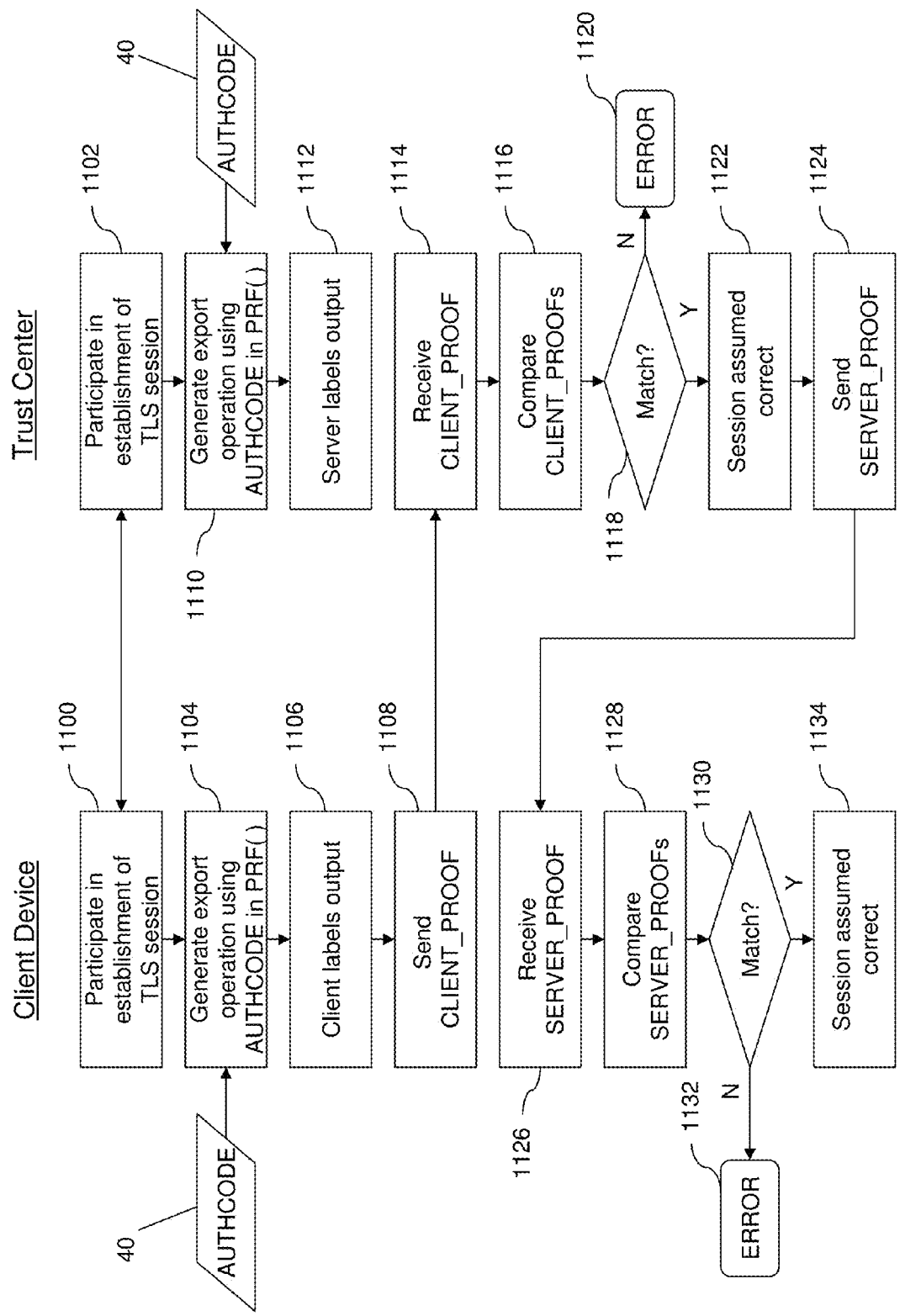
FIG. 11 is a flow chart illustrating an example of a set of computer executable operations that may be performed in using the AUTHCODE in performing key material exporters for TLS.

As defined in, for example, RFC 5705, additional cryptographic keys may be extracted from a negotiated TLS session. Referring to FIG. 11, it is recognized that the keying material exporters for TLS methods can be modified to provide a solution to the steering problem by having the client and server prove knowledge of the AUTHCODE 40 by exchanging output of the PRF( ) function after negotiating a TLS session. At 1100 and 1102 the joining client device 18 and trust center 14 respectively participate in the establishment of a TLS session by performing a TLS handshake, e.g., using the ECDHE_ECDSA key exchange algorithm. At 1104 the joining client device 18 generates the export operation defined in RFC 5705 by adding the AUTHCODE 40 into the PRF( ) function as either part of the "label" value or part of the "context" value. As is well known in the art, if no context is provided, the PRF( ) function computes: PRF(master_secret, label, client_random+server_random) [length], wherein PRF( ) is a TLS pseudorandom function in used in the session. If context is provided, the PRF( ) function computes: PRF(master_secret, label, client_random+server_random+context_value_length+context_value) [length] The output of PRF( ) is a pseudorandom bit string of [length] bytes generated from the master_secret.

The joining client device 18 parses the output into two distinct data elements at 1106 as: SERVER_PROOF‖CLIENT_PROOF=PRF(master_secret, label, client_random+server_random+context_value_length+context value)[length] and sends CLIENT_PROOF at 1108. Meanwhile, the trust center 14 also generates the export operation defined in RFC 5705 by adding the AUTHCODE 40 into the PRF( ) function as either the "label" value or "context" value at 110, labels the output at 1112 as: SERVER_PROOF‖CLIENT_PROOF=PRF(master_secret, label, client_random+server_random+context_value_length+context value)[length].

The trust center 14 receives CLIENT_PROOF at 1114 and, after receiving CLIENT_PROOF, compares the received CLIENT_PROOF to the CLIENT_PROOF value computed using the relationship discussed above at 1116. The trust center 14 determines at 1118 whether or not these values match. If the compared values differ, the TLS session is halted with an error at 1120 and it is assumed that the joining client device 18 is incorrect. If the compared values match, the trust center 14 determines that the correct client has joined at 1122 and sends SERVER_PROOF to the joining client device 18 at 1124.

The joining client device 18 receives SERVER_PROOF at 1126 and, after receiving SERVER_PROOF, compares the received SERVER_PROOF to the SERVER_PROOF value computed as discussed above at 1128. The joining client device 18 determines at 1130 whether or not these values match. If the compared values differ, the TLS session is halted with an error at 1132 and it is assumed that the joining client device 18 has joined the wrong network. If the compared values match, the joining client device 18 determines that it has joined the correct local network 12 at 1134.

It can be appreciated that the principles discussed above can be applied to other security negotiation protocols, including various TLS- and SSL-based key agreement schemes, e.g., TLS_RSA_WITH_RC4_128_SHA, TLS_RSA_WITH_AES_256_CBC_SHA, etc. Additionally, the AUTHCODE 40 may also be mixed into either the master_secret or key_block computations by, for example, appending or exclusive-ORing the AUTHCODE 40 to the master_secret before deriving the key_block as described in section 6.3 of RFC 2246.

It can also be appreciated that due to the nature of the tasks required for printing, reading, and entering codes, it may not be practical to have the AUTHCODE 40 include sufficient entropy or randomness, which may result in the space of valid AUTHCODES 40 being an exhaustible set. In such cases, an attacker could perform a dictionary attack by populating a database of values corresponding to HASH (AUTHCODE), and wait for a ClientHello message and look up the correct AUTHCODE for the detected hash value. This can be partially thwarted by salting the HASH output. For example, the ClientHello.random value could be broken into two sections, ClientHello.random=SALT‖HASH(SALT‖AUTHCODE), where SALT is a randomly generated value of sufficient size, e.g., large enough to prevent a dictionary of values "SALT‖HASH(SALT‖AUTHCODE)" from being created, for all values of (SALT, AUTHCODE). For example, setting SALT to be an 80-bit random value may be sufficient for several applications. While this salting technique may protect against a dictionary attack, the lower entropy AUTHCODE 40 in such situations may still be vulnerable to a brute force attack where the attacker observes a legitimate join and the value ClientHello.random=SALT‖HASH (SALT‖AUTHCODE), and goes offline to compute HASH(SALT‖AUTHCODE) until the correct AUTHCODE 40 is found. It has been recognized that the methods shown in FIGS. 8 to 11 may be vulnerable to one or both of the dictionary and brute force attacks when the AUTHCODE 40 has insufficient randomness.

To address these possible attacks, an additional modification to the TLS protocol, and an additional post TLS session establishment verification will now be described, which can be based on password-based key agreement schemes as described in IEEE 1363.2 and secure remote password usage.

Figure 12:
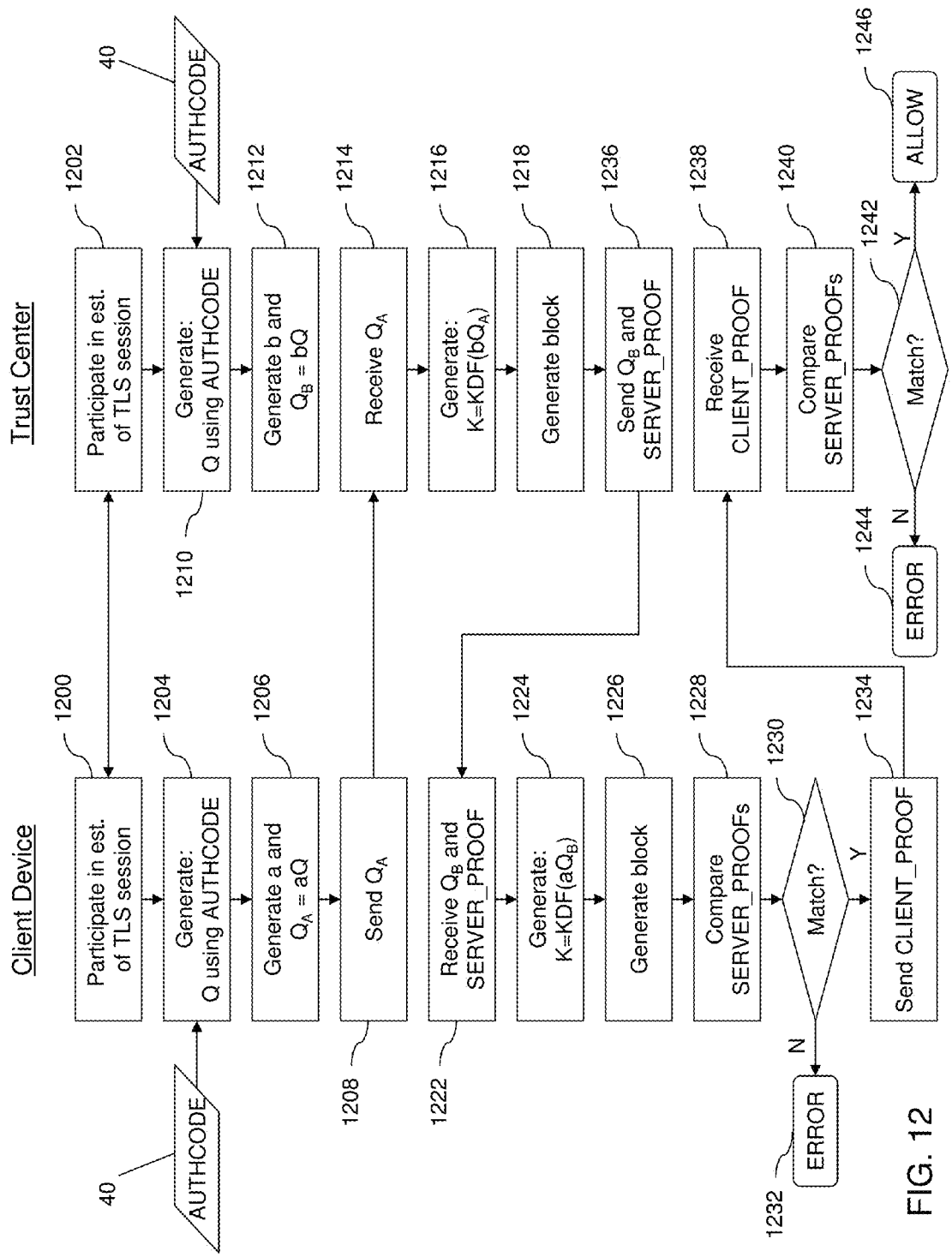
FIG. 12 is a flow chart illustrating an example of a set of computer executable operations that may be performed in verifying an AUTHCODE post TLS establishment.

Referring now to FIG. 12, a method of verifying the AUTHCODE 40 over an established TLS session during a join process is shown. The method illustrated in FIG. 12 establishes a TLS connection between the joining client device 18 and the trust center 14 at 1200 and 1202 respectively, then performs a password-based key agreement protocol with key confirmation, e.g., EC-SPEKE as specified in IEEE 1363.2.

At 1204 the joining client device 18 generates a base point Q on an elliptic curve by computing: Q=f (HASH(ClientID‖"."‖(ClientHello.random‖ServerHello.random‖AUTHCODE))), where f is a suitable function that takes the output of the HASH and maps it to an elliptic curve point on the desired curve. The joining client device 18 then generates a random value a and computes $Q_A$=aQ at 1206. $Q_A$ is then sent to the trust center 14 at 1208. The trust center 14 also generates Q in same way as the joining client device 18 at 1210, generates a random value b and computes $Q_B$=bQ at 1212. The trust center 14 receives $Q_A$ at 1214 and computes K=KDF(b$Q_A$) at 1216. It can be appreciated that KDF is a suitable key derivation function, such as the KDFs described in IEEE 1363.2. The trust center 14 then generates the block SERVER_PROOF‖CLIENT_PROOF=PRF (K, (other information, e.g., ClientHello.random, ServerHello.random, etc.)). For example, the block may include the following format: SERVER_PROOF‖CLIENT_PROOF=PRF(master_ secret, label, client_random+server_random+context_ value_length+context value)[length] as used above. The trust center 14 sends $Q_B$ and SERVER_PROOF to the joining client device 18 at 1236.

The joining client device 18 receives $Q_B$ and SERVER_PROOF at 1222 and generates K=KDF(a$Q_B$) at 1224. The joining client device 18 then generates the block SERVER_PROOF‖CLIENT_PROOF=PRF (K, (other information, e.g., ClientHello.random, ServerHello.random, etc.)) at 1226. For example, the block may include the following format: SERVER_PROOF‖CLIENT_PROOF=PRF(master_secret, label, client_random+server_random+context_value_length+context value)[length] as used above. The joining client device 18 compares the received SERVER_PROOF with that computed from the block at 1228. The joining client device 18 determines at 1230 whether or not these values match. If not, the session is halted and indicating an error at 1232. If the SERVER_PROOF values match, the joining client device 18 sends CLIENT_PROOF to the trust center 14 at 1234, which is received by the trust center 14 at 1238. The trust center 14 compares the received CLIENT_PROOF with that computed from the block at 1240 and determines at 1242 whether or not these values match.

If not, the connection is dropped indicating an error at 1244. If the CLIENT_PROOF values match, the joining client device 18 is allowed to join the local network 12 at 1246.

Figure 13:
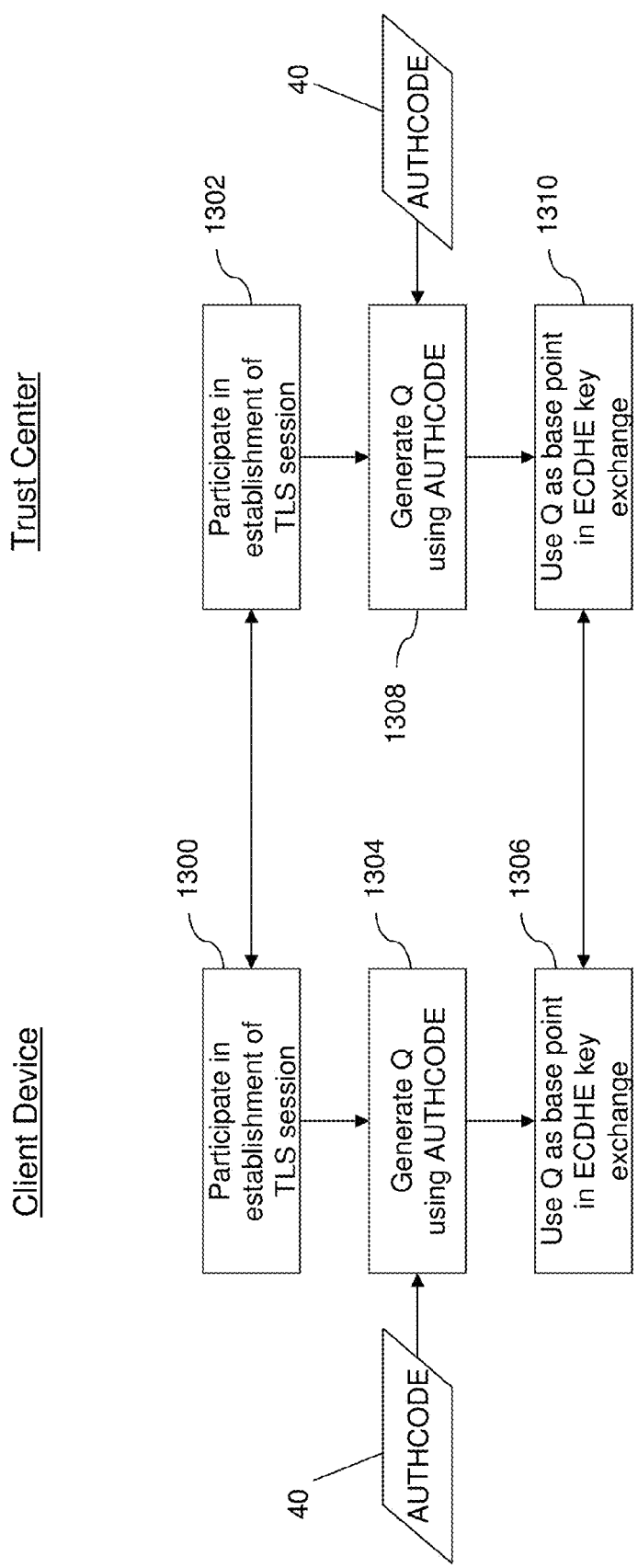
FIG. 13 is a flow chart illustrating an example of a set of computer executable operations that may be performed in using the AUTHCODE in performing a modified TLS establishment.

Referring now to FIG. 13 a method of verifying the AUTHCODE during the establishment of a TLS session during a join process. It has been recognized that the base point being used in the ECDH scheme of the TLS session can be modified in order to verify the AUTHCODE and may use a password-based key agreement protocol to directly establish the TLS session key. The TLS session is successful only if the AUTHCODE 40 used by both endpoints is the same.

As shown in FIG. 13, after participating in establishing a TLS session at 1300 and 1302 respectively, the joining client device 18 and the trust center 14 may generate a new base point Q at 1304 and 1308 respectively. The new base point is to be used in an ECDH operation where Q=f (HASH (AGREED_UPON_STRING|"." (ClientHello.random)|| (ServerHello.random||AUTHCODE))), where f is a suitable function that takes the output of HASH and generates an elliptic curve point on the TLS-negotiated curve.

The client used the base point Q as the base point in an ECDHE key exchange at 1306 and the trust center 14 likewise uses Q at 1310.

It can be appreciated that the above-described principles may also be used with Datagram TLS (DTLS) given the similarities between the two solutions. The DTLS protocol secures UDP network communications and was designed to be similar to TLS, in order to keep most protocol messages the same, allowing many of the same TLS cipher suites to be used with DTLS. Some machine-to-machine networks such as those shown in FIGS. 1 and 2 may use UDP and DTLS. One example application layer protocol designed for such environments is CoAP, which aims to provide an HTTP-like protocol over UDP, and is secured with DTLS. When CoAP is secured with a "certificate mode", i.e. security is provided with certificates, the steering problem described above may be present. As such, the principles discussed herein may be applied to address such a steering problem.

Similarly, as noted above, the AUTHCODE 40 may also be used in other security negotiation protocols such as IPSec. For example, the key agreement protocol used in IPSec may be modified by modifying the internet key exchange (IKE) to include the AUTHCODE in the key derivation step (described in section 2.13 of RFC 4306, for IKE v2).

Accordingly, there is provided a method of enabling a client device to connect to a network, the method comprising: obtaining an authorization code via a communication channel different from the network, the authorization code corresponding to the client device; and after detecting initiation of a security negotiation protocol by the client device, using the authorization code in at least one security negotiation operation.

There is also provided a method of connecting to a network, the method comprising: the client device initiating a security negotiation protocol with a server device for the network; and using an authorization code in at least one security negotiation operation, the authorization code having been provided to the server device via a communication channel different from the network, the authorization code corresponding to the client device.

There is also provided a method of enabling a client device to connect to a network, the method comprising: providing an authorization code to the client device via a communication channel different from the network, the authorization code corresponding to the client device; and after detecting initiation of a security negotiation protocol by the client device, using the authorization code in at least one security negotiation operation.

There are also provided computer readable media comprising instructions for performing the above methods, and client and server devices configured for performing the above methods.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the , any component of or related to the , etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of enabling a client device to connect to a network, the method comprising:
    obtaining, at a server device and from the client device, an authorization code via an out-of-band communication channel different from the network, the authorization code corresponding to the client device, the authorization code being used in at least one of a PRF ( ) function, a key exchange during establishment of a transport layer security (TLS) session, or a key derivation step during establishment of the TLS session; and
    after detecting initiation of a security negotiation protocol by the client device, using the authorization code in at least one cryptographic operation during establishment of the TLS session by modifying the security negotiation protocol to utilize the authorization code, wherein modifying the security negotiation protocol to utilize the authorization code comprises:
        obtaining a negotiated secret elliptic curve point based on the authorization code;
        generating a modified elliptic curve point by multiplying the negotiated secret elliptic curve point by the authorization code; and
        using a coordinate of the modified elliptic curve point for verifying the authorization code during the establishment of the TLS session.

2. The method of claim 1, further comprising allowing the client device to access at least one network resource when the security negotiation is successful.

3. The method of claim 1, further comprising obtaining a public key of the client device and using the public key and the authorization code in authenticating the client device to a server device.

4. The method of claim 3, the public key of the client device being provided in a digital certificate.

5. The method of claim 1, the authorization code being used in generating at least one of a master_secret, a key_block, and a pre_master_secret generated during establishment of the TLS session.

6. The method of claim 5, the authorization code being used in establishing the TLS session by:
   forming the pre_master_secret from an x-coordinate of the modified elliptic curve point.

7. The method of claim 1, further comprising using the authorization code in establishing a key subsequent to completing a secure session using the security negotiation protocol.

8. A non-transitory computer readable storage medium comprising computer executable instructions for enabling a client device to connect to a network, the computer executable instructions comprising instructions for:
   obtaining, at a server device and from the client device, an authorization code via an out-of-band communication channel different from the network, the authorization code corresponding to the client device, the authorization code being used in at least one of a PRF ( ) function, a key exchange during establishment of a transport layer security (TLS) session, or a key derivation step during establishment of the TLS session; and
   after detecting initiation of a security negotiation protocol by the client device, using the authorization code in at least one cryptographic operation during establishment of the TLS session by modifying the security negotiation protocol to utilize the authorization code, wherein modifying the security negotiation protocol to utilize the authorization code comprises:
      obtaining a negotiated secret elliptic curve point based on the authorization code;
      generating a modified elliptic curve point by multiplying the negotiated secret elliptic curve point by the authorization code; and
      using a coordinate of the modified elliptic curve point for verifying the authorization code during the establishment of the TLS session.

9. The non-transitory computer readable storage medium of claim 8, wherein the computer executable instructions further comprise instructions for allowing the client device to access at least one network resource when the security negotiation is successful.

10. The non-transitory computer readable storage medium of claim 8, wherein the computer executable instructions further comprise instructions for obtaining a public key of the client device and using the public key and the authorization code in authenticating the client device to a server device.

11. The non-transitory computer readable storage medium of claim 10, wherein the public key of the client device is provided in a digital certificate.

12. The non-transitory computer readable storage medium of claim 8, the authorization code being used in generating at least one of a master_secret, a key_block, and a pre_master_secret generated during establishment of the TLS session.

13. The non-transitory computer readable storage medium of claim 12, the authorization code being used in establishing the TLS session by:
   forming the pre_master_secret from an x-coordinate of the modified elliptic curve point.

14. A server device comprising a processor, and a memory, the memory comprising computer executable instructions for enabling a client device to connect to a network by operating the processor to:
   obtain, from the client device, an authorization code via an out-of-band communication channel different from the network, the authorization code corresponding to the client device, the authorization code being used in at least one of a PRF ( ) function, a key exchange during establishment of a transport layer security (TLS) session, or a key derivation step during establishment of the TLS session; and
   after detecting initiation of a security negotiation protocol by the client device, use the authorization code in at least one cryptographic operation during establishment of the TLS session by modifying the security negotiation protocol to utilize the authorization code, wherein modifying the security negotiation protocol to utilize the authorization code comprises:
      obtaining a negotiated secret elliptic curve point based on the authorization code;
      generating a modified elliptic curve point by multiplying the negotiated secret elliptic curve point by the authorization code; and
      using a coordinate of the modified elliptic curve point for verifying the authorization code during the establishment of the TLS session.

15. The server device of claim 14, wherein the computer executable instructions operate the processor to allow the client device to access at least one network resource when the security negotiation is successful.

16. The server device of claim 14, wherein the computer executable instructions operate the processor to obtain a public key of the client device and use the public key and the authorization code in authenticating the client device to a server device.

17. The server device of claim 16, wherein the public key of the client device is provided in a digital certificate.

18. The method of claim 1, wherein obtaining a negotiated secret elliptic curve point based on the authorization code comprises:
   obtaining an output of a HASH function based on the authorization code; and
   mapping the output to an elliptic curve point on the negotiated secret elliptic curve.

* * * * *